US008103964B2

(12) United States Patent
Okabayashi

(10) Patent No.: US 8,103,964 B2

(45) Date of Patent: Jan. 24, 2012

(54) PARAMETER EDITOR AND SIGNAL PROCESSOR

(75) Inventor: Masaaki Okabayashi, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 493 days.

(21) Appl. No.: 11/729,764

(22) Filed: Mar. 28, 2007

(65) Prior Publication Data

US 2007/0229474 A1 Oct. 4, 2007

(30) Foreign Application Priority Data

Mar. 29, 2006 (JP) ................................ 2006-090682

(51) Int. Cl.
*G06F 3/048* (2006.01)

(52) U.S. Cl. ......................................... 715/767; 700/94

(58) Field of Classification Search .................. 715/761; 700/94
See application file for complete search history.

(56) References Cited

U.S. PATENT DOCUMENTS

| | | | | |
|---|---|---|---|---|
| 5,952,998 | A * | 9/1999 | Clancy et al. | 345/173 |
| 6,101,324 | A * | 8/2000 | Connell et al. | 703/17 |
| 6,281,885 | B1 | 8/2001 | Eastty et al. | |
| 7,480,870 | B2 * | 1/2009 | Anzures et al. | 715/772 |
| 7,593,000 | B1 * | 9/2009 | Chin | 345/156 |
| 7,634,780 | B2 * | 12/2009 | Rhoten et al. | 719/328 |
| 7,636,899 | B2 * | 12/2009 | Purcell et al. | 715/790 |
| 7,698,389 | B2 * | 4/2010 | Sesek et al. | 709/220 |
| 7,742,609 | B2 * | 6/2010 | Yeakel et al. | 381/119 |
| 7,929,717 | B2 * | 4/2011 | Okabayashi et al. | 381/119 |
| 2002/0191029 | A1 * | 12/2002 | Gillespie et al. | 345/810 |
| 2003/0059066 | A1 * | 3/2003 | Kohyama et al. | 381/119 |
| 2003/0128192 | A1 * | 7/2003 | van Os | 345/173 |
| 2005/0068253 | A1 * | 3/2005 | Bartels | 345/1.3 |
| 2006/0015198 | A1 * | 1/2006 | Okabayashi et al. | 700/94 |
| 2008/0094371 | A1 * | 4/2008 | Forstall et al. | 345/173 |
| 2008/0165141 | A1 * | 7/2008 | Christie | 345/173 |
| 2008/0215240 | A1 * | 9/2008 | Howard et al. | 701/213 |
| 2009/0085877 | A1 * | 4/2009 | Chang et al. | 345/173 |

OTHER PUBLICATIONS

"Digital Mixing Console M7CL Owner's Manual", by Yamaha Corporation (relevant pp. 15 to 29 and 61 to 65).

* cited by examiner

*Primary Examiner* — William Bashore
*Assistant Examiner* — David Phantana Angkool
(74) *Attorney, Agent, or Firm* — Morrison & Foerster LLP

(57) ABSTRACT

A device editing a value of a parameter according to an operation by a user operates in a normal mode and in a detailed edit mode. In the normal mode, according to an operation sensed by a touch panel, the position of a cursor in a main screen displayed on a display panel is controlled, and a parameter to be edited is selected and an operation mode is shifted to the detailed edit mode. In the detailed edit mode, a screen for accepting an edit operation of the parameter selected in the normal mode is displayed on a touch screen and a value of the parameter stored in a current memory is changed according to the operation sensed by the touch panel.

4 Claims, 7 Drawing Sheets

F I G. 1
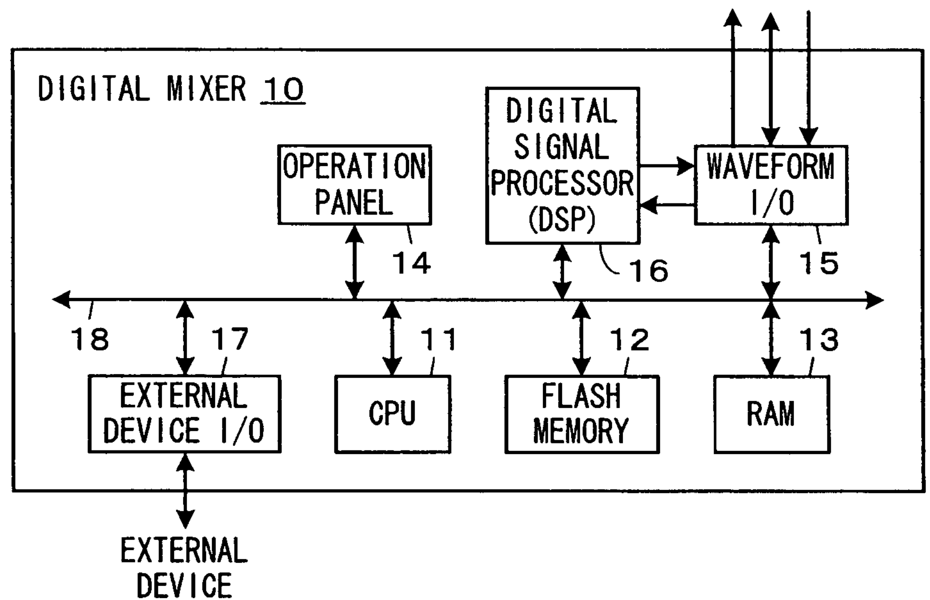
F I G. 2
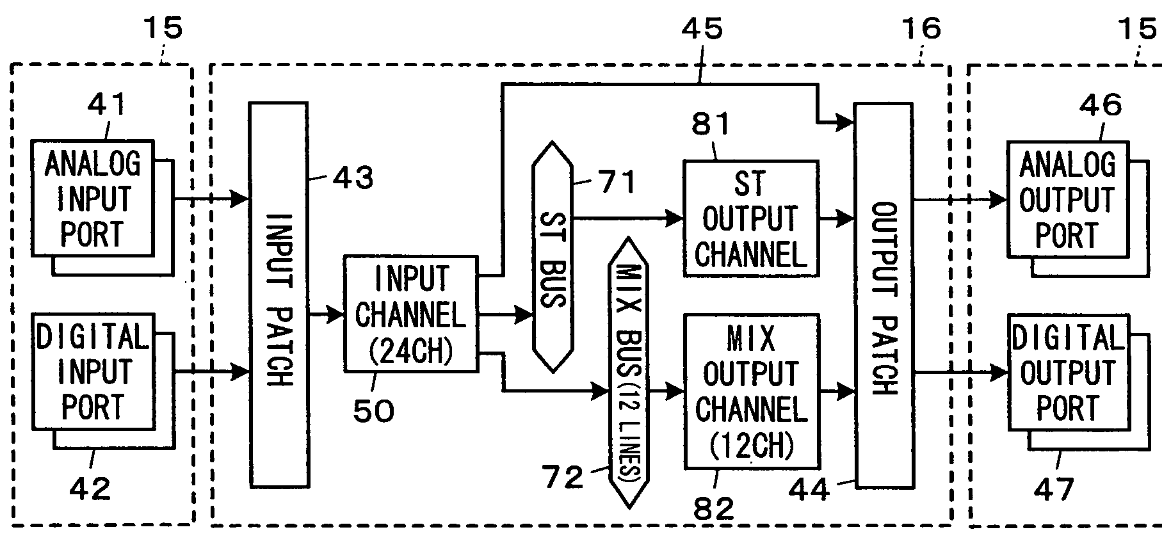

F I G. 3
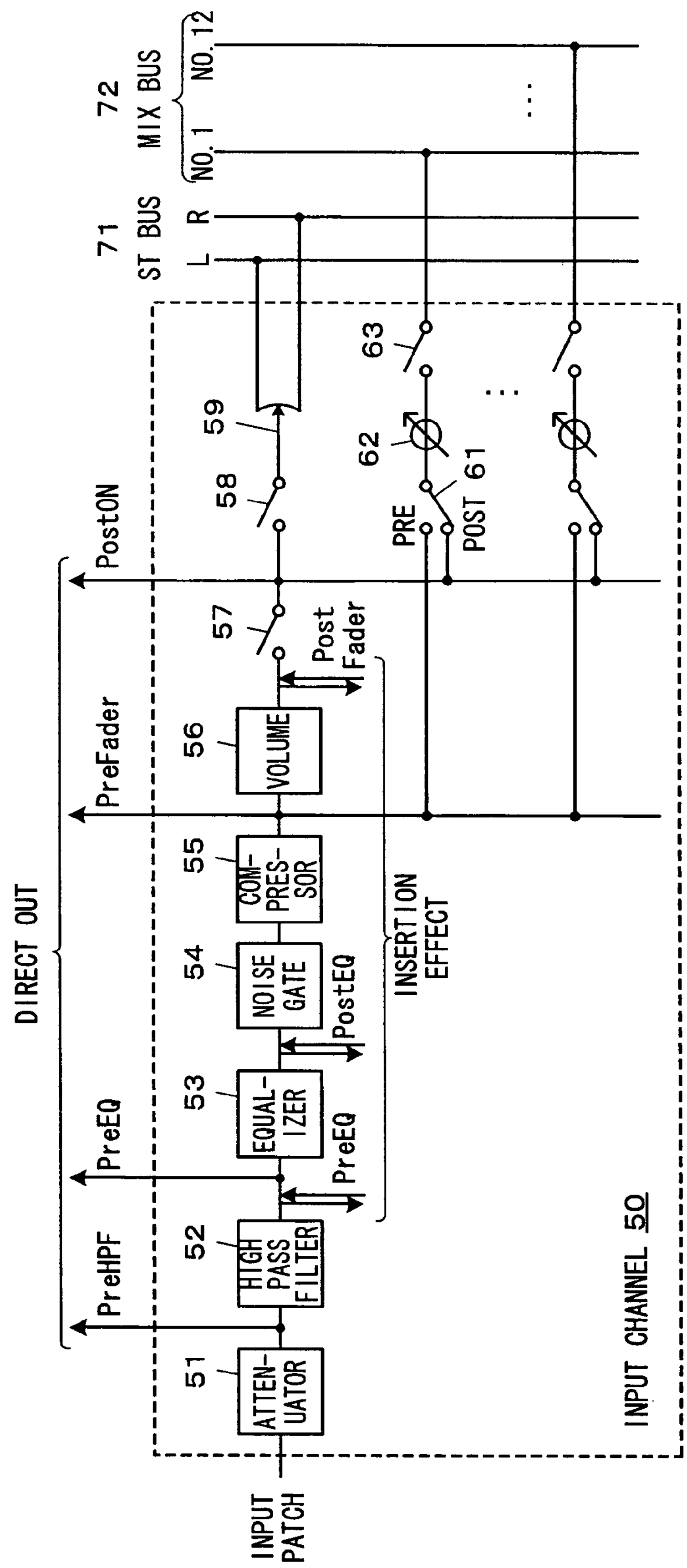

F I G. 6
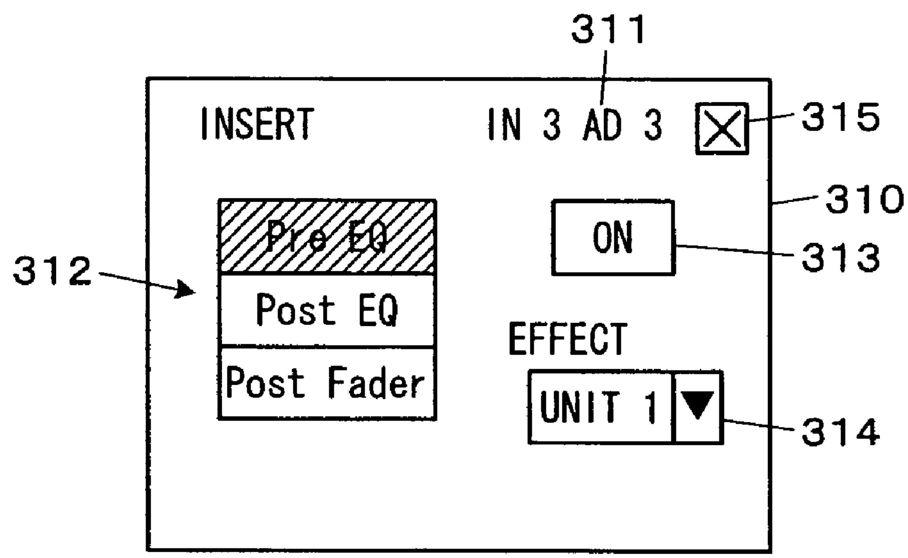
F I G. 7
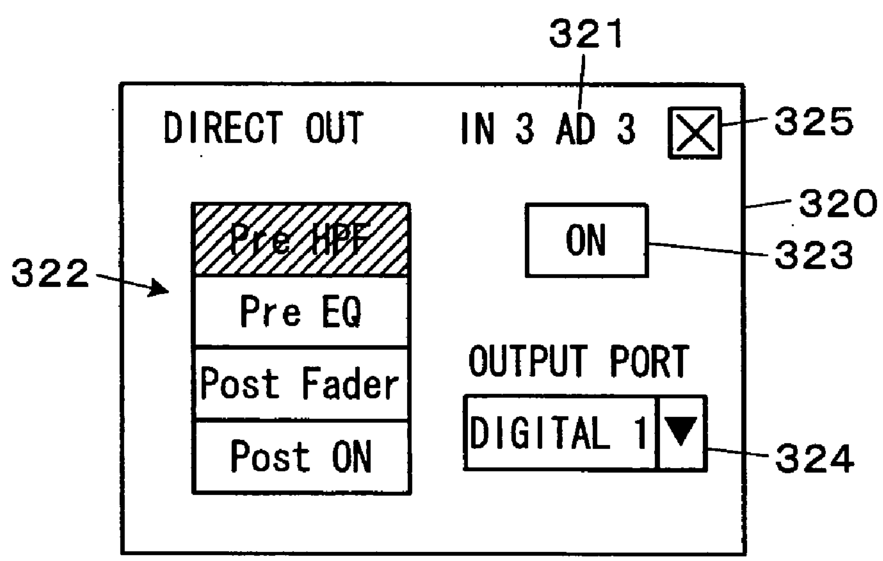

F I G. 8
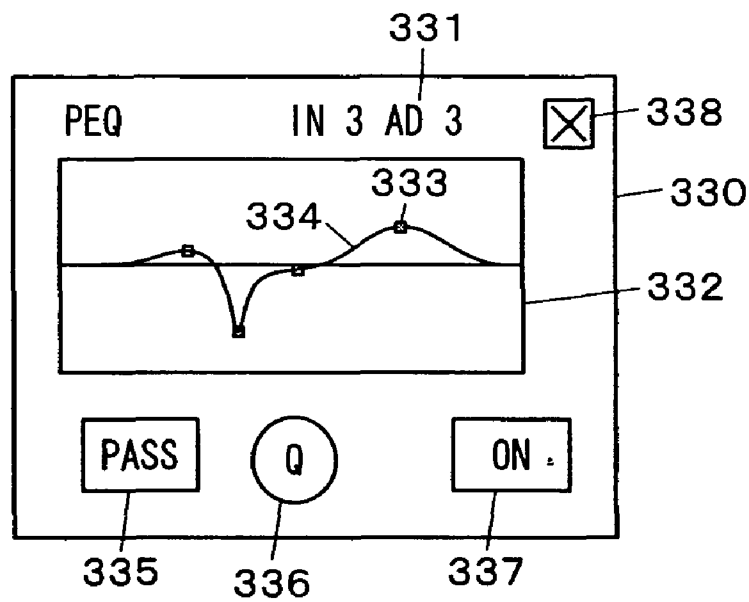
F I G. 9
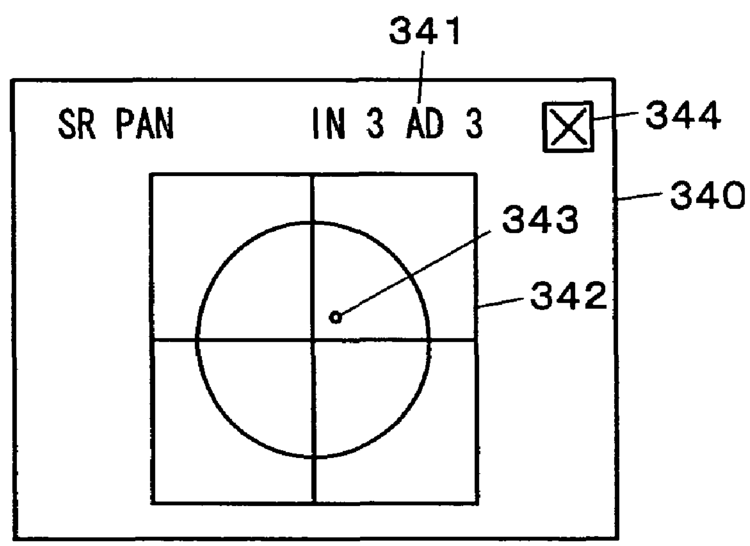

PARAMETER EDITOR AND SIGNAL PROCESSOR

BACKGROUND OF THE INVENTION

1. Field of the Invention

The invention relates to a parameter editor editing values of parameters according to a user's operation and a signal processor having a function of editing values of parameters used in signal processing according to a user's operation.

2. Description of the Related Art

There has been conventionally used a signal processor such as a digital mixer capable of editing values of parameters used in signal processing according to a user's operation.

For example, "DIGITAL MIXING CONSOLE M7CL OWNER'S MANUAL" (Document 1) by Yamaha Corporation describes in pages 15 to 29 and 61 to 65 a digital mixer which displays, on a main display, a GUI (graphical user interface) screen for accepting the setting of parameters and accepts an edit operation in this screen. Further, in this digital mixer, the main display includes a touch panel, thereby enabling a user to operate the GUI by directly touching the screen.

SUMMARY OF THE INVENTION

According to the digital mixer described in the above Document 1, when a button or a field corresponding to a specific parameter is pressed on a main screen displayed on the main display, a popup window displaying details or an overview of the parameter is displayed, so that in this window, a user can perform a detailed edit operation regarding the parameter. This is because it is not possible for only the main screen to display all the GUIs for accepting the detailed edit operation regarding the parameters, and even if all the GUIs are displayed, it is low in visibility and operability because of minutely displayed contents.

However, displaying the popup window on the main display has a problem that the main screen cannot be seen while the popup widow is displayed.

Solving the above problem by simply displaying the main screen and the popup screen at separate positions can arouse another problem of poor operability because, after a parameter to be edited is selected on the main screen, it is necessary to operate a different position to give an edit instruction in the popup window. This problem occurs both in a case where a touch panel is used and in a case where a cursor is moved by a mouse or the like.

Further, such a problem similarly occurs in a case where a value of a parameter is set in a device other than a signal processing device.

It is an object of the invention to solve such a problem and achieve high operability when a user performs a detailed edit operation of values of parameters while referring to a main screen.

To attain the above object, a parameter editor of the invention includes: a first display; a second display including a sensor sensing an operation by a user; a first accepting device that accepts a selection instruction of a parameter to be edited in a screen displayed on the first display, based on the operation sensed by the sensor; a second accepting device that, in a case where the selection instruction is accepted, causes the second display to display a screen for accepting an edit operation of the selected parameter and accepts an edit instruction of the parameter in the screen displayed on the second display, based on the operation sensed by the sensor; and a parameter editing device that changes a value of the parameter according to the instruction accepted by the second accepting device.

In such a parameter editor, preferably, in a state where the second accepting device accepts the edit instruction of the parameter, the operation sensed by the sensor is not handled as an operation to the screen displayed on the first display.

A signal processor of the invention includes: a memory storing values of a plurality of parameters; a signal processing device performing signal processing based on the values of the parameters stored in the memory; a first display displaying a main screen displaying contents regarding the plural parameters; a second display including a touch panel; and a controller performing control according to a mode, wherein the mode includes: a first mode in which, according to an operation sensed by the touch panel, the controller controls a position of a cursor in the main screen and shifts to a second mode after a parameter to be edited is selected; and the second mode in which the controller causes the second display to display a detailed edit screen for accepting an edit instruction of the parameter selected in the first mode, and according to an operation sensed by the touch panel, changes a value of the parameter for which the edit instruction is accepted in the detailed edit screen, out of the parameters stored in the memory.

In such a signal processor, preferably, in the second mode, the operation sensed by the touch panel is not handled as an operation to the main screen The above and other objects, features and advantages of the invention will be apparent from the following detailed description which is to be read in conjunction with the accompanying drawings.

BRIEF DESCRIPTION OF THE DRAWINGS

FIG. 1 is a block diagram showing the configuration of a digital mixer which is an embodiment of a signal processor of the invention;

FIG. 2 is a diagram showing in more detail the configuration of a DSP shown in FIG. 1;

FIG. 3 is a diagram showing in more detail the structure of an input channel shown in FIG. 2;

FIG. 6 is a view showing a display example of a detailed edit screen for insertion effect displayed on a touch screen shown in FIG. 4;

FIG. 7 is a view showing a display example of a detailed edit screen for direct-out displayed on the touch screen;

FIG. 8 is a view showing a display example of a detailed edit screen for parametric equalizer displayed on the touch screen;

FIG. 9 is a view showing a display example of a detailed edit screen for surround pan displayed on the touch screen;

DETAILED DESCRIPTION OF THE PREFERRED EMBODIMENTS

Figure 4:
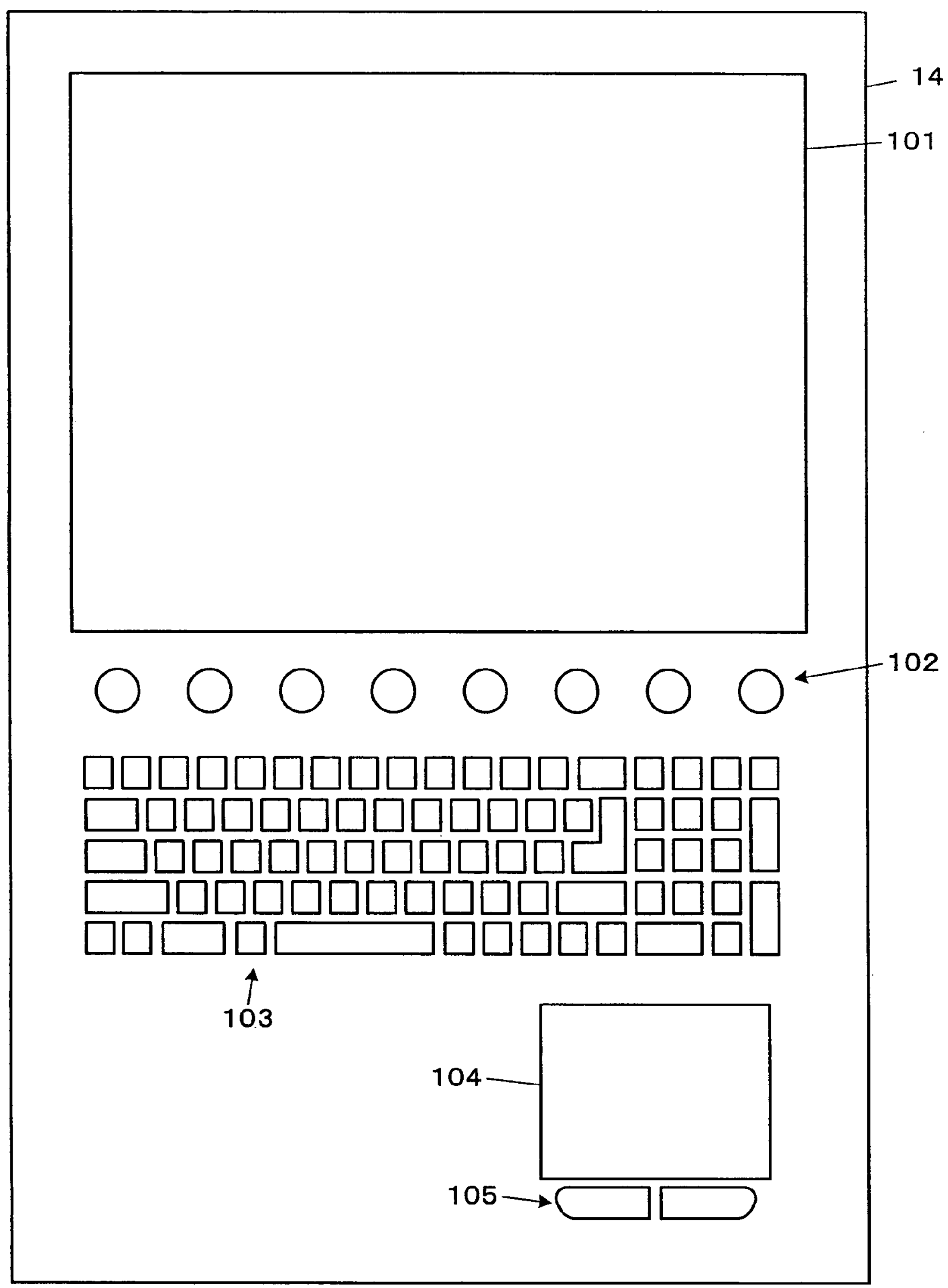
FIG. 4 is a diagram showing in more detail the structure of an operation panel shown in FIG. 1.

Hereinafter, the best mode for carrying out the invention will be concretely described based on the drawings.

First, FIG. 1 shows the configuration of a digital mixer which is an embodiment of the signal processor of the invention. This digital mixer is also a parameter editor having a parameter edit function.

As shown in FIG. 1, this digital mixer 10 includes a CPU 11, a flash memory 12, a RAM 13, an operation panel 14, a waveform I/O 15, a digital signal processor (DSP) 16, and an external device I/O 17, all of which are connected to one another via a system bus 18. The digital mixer 10 has a function of performing various signal processing to audio signals inputted via a plurality of input channels (ch) and outputting the processed signals from a plurality of output channels.

The CPU 11 is a controller controlling the whole operation of the digital mixer 10. By executing a desired program stored in the flash memory 12, the CPU 11 executes processing such as: controlling the data transmission/reception in the waveform I/O 15 and the external device I/O 17; controlling the display on the operation panel 14 and detecting operations on the operation panel 14; controlling the change of parameter values and the operation of respective parts according to the detected operation; controlling signal processing in the DSP 16; and so on.

The flash memory 12 is a rewritable nonvolatile memory storing the program executed by the CPU 11 and so on.

The RAM 13 is a memory which stores data to be temporarily stored and is used as a work memory of the CPU 11.

The operation panel 14, which will be described in detail later, includes a display panel, a touch screen, a keyboard, encoders, and so on, and has functions of displaying GUIs, accepting an edit operation of values of parameters by a user, and so on.

The waveform I/O 15 is an interface to accept the input of audio signals which are to be processed in the DSP 16 and output the processed audio signals. The waveform I/O 15 can have an appropriate combination of a plurality of A/D conversion boards capable of analog input from four ports per one board, D/A conversion boards capable of analog output from four ports per board, and digital input/output boards capable of digital input/output from eight ports per board, and actually, signals are inputted/outputted via these boards. Further, an external effector for insertion effect can also be connected to the waveform I/O 15.

The DSP 16 is a digital signal processor which includes a signal processing circuit, and performs various kinds of signal processing such as mixing and equalizing to the audio signals inputted from the waveform I/O 15, according to values of various parameters which are set in a current memory, and outputs the processed audio signals to the waveform I/O 15. A memory area of the current memory can be provided in the RAM 13 or in a memory that the DSP 16 itself has. It is also possible that the contents of the current memory are stored as a scene in the flash memory 12 and are retained even after the digital mixer 10 is turned off to be read for later use in signal processing.

Incidentally, the DSP 16 has 24 input channels, and the input ports of the waveform I/O 15 are made to correspond to the input channels of the DSP 16 by an input patch, whereby a signal inputted to the waveform I/O 15 can be inputted to the corresponding input channel.

Further, the DSP 16 has 12-lines of mixing (MIX) buses, and a signal inputted to the input channel can be sent to the buses according to the set contents of the parameters, and signals inputted to the same bus can be mixed.

Outputs of these buses are outputted via corresponding output channels, and as for output paths, similarly to the input paths, the output channels of the DSP 16 are made to correspond to the output ports of the waveform I/O 15 respectively by an output patch.

The external I/O 17 is an interface for communication with an external device such as a PC (personal computer), and can be, for example, an interface of a USB (Universal Serial Bus) type or can be an interface for communication by Ethernet (registered trademark). It is also conceivable to prepare an interface for connection to an external display, a mouse, and the like.

Next, FIG. 2 shows in more detail the configuration of the DSP 16 shown in FIG. 1.

As shown in FIG. 2, the DSP 16 has an input patch 43, input channels 50, ST buses 71, MIX buses 72, ST output channels 81, MIX output channels 82, an output patch 44, and a direct-out line 45.

In the DSP 16, an audio signal inputted from any of analog input ports 41 and any of digital input ports 42 provided in the waveform I/O 15 is patched (assigned) to one of the 24 input channels 50 by the input patch 43 and undergoes signal processing by an attenuator, an equalizer, and so on in this input channel, and thereafter, the processed signal is sent to the ST buses 71 and the 12-lines of MIX buses 72. This transmission can also be made OFF.

In the pair of ST buses 71 and each line of the MIX buses 72, the signals inputted from the input channels 50 are mixed, and signals resulting from the mixing are outputted to a corresponding pair of ST output channels 81 and to the corresponding one of the 12 MIX output channels 82. Then, in each of the output channels 81 and 82, signal processing is performed to the signal inputted from the ST bus 71 or the MIX bus 72 by an equalizer, a compressor, and so on, and the processed signal is patched by the output patch 44 to an analog output port 46 or a digital output port 47 provided in the waveform I/O 15 and is outputted from the patched output port.

Further, also provided is the direct-out line 45 for direct-out, that is, for directly inputting a signal at a position selected in the input channel 50 by a user to the output patch 44 and patching the signal to the output port 46 or 47.

By setting values of predetermined parameters, it is possible to control the contents of the signal processing performed by the respective parts provided in the DSP 16, and functions of the respective parts may be realized by software or may be realized by hardware.

Next, FIG. 3 shows in more detail the structure of the input channel 50 shown in FIG. 2.

As shown in FIG. 3, each of the input channels 50 has an attenuator 51, a high-pass filter 52, an equalizer 53, a noise gate 54, a compressor 55, a volume 56, and an ON switch 57. In each path ahead through which a signal is inputted to the ST buses 71, a TO-ST (to-stereo) switch 58 and a pan 59 are provided. In each path through which a signal is sent to each of the MIX buses 72, a PRE/POST switch 61, a send level fader 62, and a send ON switch 63 are provided.

Among them, the attenuator 51 has a function of attenuating a signal. The high-pass filter 52 has a function of passing a signal component with a predetermined frequency or higher therethrough and attenuating other signal components. The equalizer 53 has a function of adjusting a frequency characteristic of a signal. The noise gate 54 has a function of reducing noise by attenuating a signal at predetermined level or lower. The compressor 55 has a function of narrowing a dynamic range by attenuating a signal at predetermined level or higher. The volume 56 has a function of adjusting level of a signal. The ON switch 57 has a function of switching ON/OFF of output.

Here, in deciding a final gain of the volume 56, a gain decided by a fader corresponding to the input channel 50 is taken into consideration, and besides, in a case where the input channel 50 belongs to a DCA group, a gain decided by a fader corresponding to this DCA group is also taken into consideration.

The TO-ST switch 58 has a function of switching ON/OFF of signal output to the ST buses 71. The pan 59 has a function of controlling a sound image localization position of a stereo signal by adjusting distribution of an output to the L (left) and R (right) ST buses 71.

The PRE/POST switch 61 is a switch to select the acquisition position of a signal which is to be sent to the corresponding MIX bus 72. The send level fader 62 has a function of adjusting level of a signal which is to be sent to the MIX bus 72. The send ON switch 63 has a function of switching ON/OFF of signal transmission to the MIX bus 72.

A signal inputted to such an input channel 50 sequentially undergoes signal processing in the attenuator 51 up to the pan 59, and thereafter is inputted to the ST buses 71. When the PRE/POST switch 61 is on the PRE side, a signal having undergone processing in the compressor 55 is inputted to the transmission path to the corresponding MIX bus 72, and when it is on the POST side, a signal having undergone processing in the ON switch 57 is inputted thereto. Then, after undergoing signal processing by the send level fader 62 and the send ON switch 63, the signal is inputted to the corresponding MIX bus 72.

In the input channel 50, signal transmission paths to the direct-out line 45 are provided at four positions PreHPF, PreEQ, PreFader, and PostON, and a signal at one of these positions can be inputted to the output patch 44 through the direct-out line 45. Further, at three positions PreEQ, PostEQ, and PostFader, signal input/output paths for insertion effect are provided so that it is possible to input a signal at one of these positions to an external effector and return the signal processed by the external effector to the original position.

FIG. 3 shows the structure of only the single input channel 50, but the other 23 input channels 50 also have the same structure, and signals inputted from these 24 input channels 50 can be mixed in the ST buses 71 and each of the MIX buses 72.

Next, FIG. 4 shows the schematic structure of the operation panel 14 included in the digital mixer 10.

As shown in FIG. 4, the operation panel 14 includes a display panel 101, encoders 102, a keyboard 103, a touch screen 104, and click buttons 105.

The display panel 101 is a first display displaying a display screen such as a GUI and can be constituted by a liquid crystal display (LCD) or the like.

The encoders 102 are rotary encoders and are controls for accepting instructions to increment/decrement values of parameters displayed in the GUI displayed on the display panel 101.

The keyboard 103 is a control for accepting input of characters and numerals.

The touch screen 104 is a second display displaying a display screen such as a GUI and also includes a sensor sensing a touch operation (touch to the screen), a tap operation (tapping on the screen), a slide operation (sliding of a finger on the screen), and so on by a user. Concretely, the touch screen 104 can be constituted by stacking a touch panel, which is the sensor, on a LCD.

The click buttons 105 are controls for accepting click operations on the GUI displayed on the display panel 101.

The combination of the touch screen 104 and the click buttons 105 can be used as a pointing device similar to a mouse.

In the digital mixer 10, by causing the CPU 11 to execute an appropriate program, a user can operate an OS (operating system) including a window system as in a generally known PC, by using the displays and the controls on the operation panel 14. Then, the CPU 11 executes a parameter edit program on the OS to display the GUIs on the display panel 101 and the touch screen 104, so that a user can perform a parameter change operation by using the encoders 102 as well.

This change operation is accepted in one of a normal mode as a first mode and a detailed edit mode as a second mode.

In the normal mode, no particular screen is displayed on the touch screen 104. A user's operation sensed by the touch screen 104 is accepted as an operation instruction to the GUI displayed on the display panel 101, and according to the instruction contents, a cursor on the GUI displayed on the display panel 101 is moved, and a parameter on the GUI is selected. Incidentally, an external pointing device such as a mouse can be also used for the cursor movement and the parameter selection.

In the detailed edit mode, a GUI for accepting an edit operation regarding the parameter selected in the GUI displayed on the display panel 101 is displayed on the touch screen 104. Further, the user's operation sensed by the touch screen 104 is accepted as an operation instruction to the GUI displayed on the touch screen 104, and a value of the parameter is changed according to the instruction contents. If the GUI has a portion displaying values of parameters, the display in this portion is also updated when the value is changed.

Figure 5:
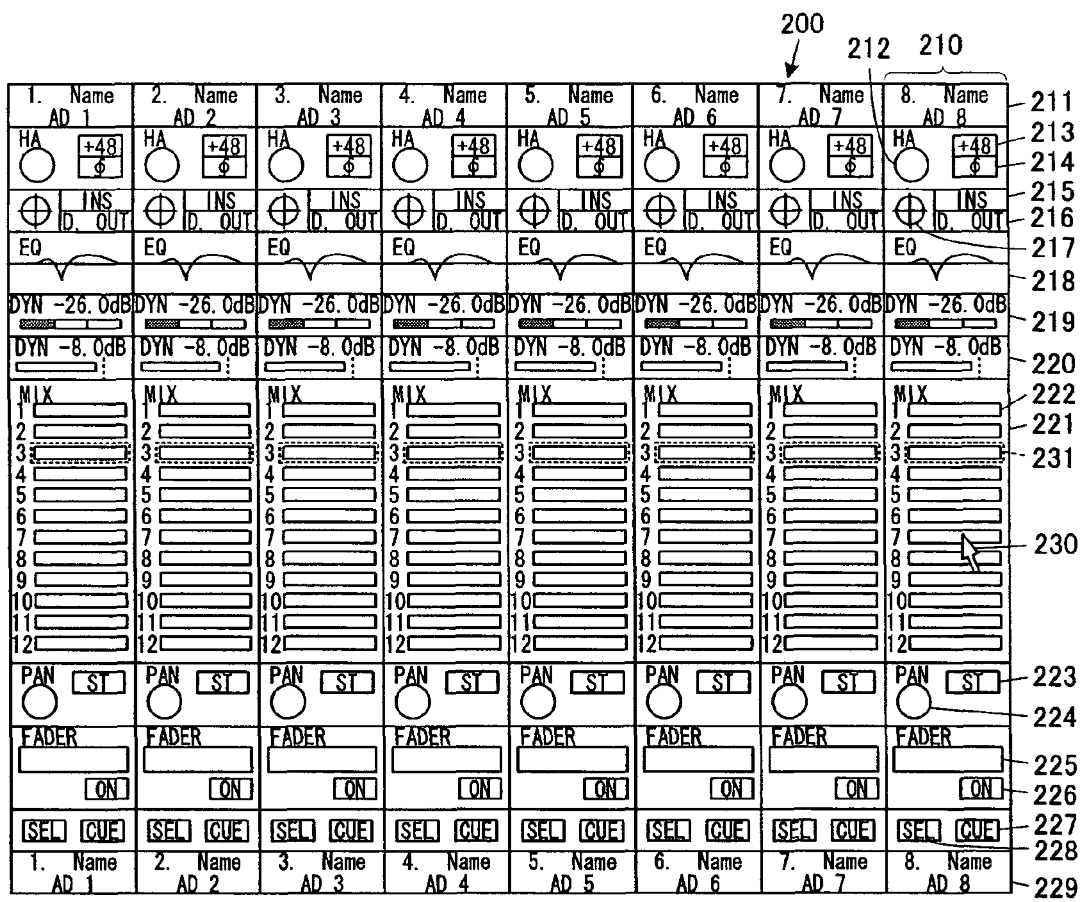
FIG. 5 is a view showing a display example of an input channel screen displayed on a display panel shown in FIG. 4.

Next, FIG. 5 shows a display example of an input channel screen, as an example of the GUI displayed on the display panel 101.

This input channel screen 200 is a GUI for displaying the contents currently set in a current memory as parameters used in signal processing in the input channels 50 and accepting instructions regarding the edit of the contents. When an instruction to display the input channel screen 200 is given in another screen (not shown), the CPU 11 displays the input channel screen 200 on the display panel 101. Though the 24 input channels 50 are provided, one input channel screen 200 displays parameters for eight channels and accepts edit instructions for the parameters for the eight channels. A channel range as a display target can be selected in another screen (not shown). FIG. 5 shows an example where the contents regarding first to eighth input channels are displayed.

In such an input channel screen 200, the contents of the respective channels are displayed in channel slots which are provided for the respective input channels. Each of the channel slots 210 has channel name blocks 211, 229, a HA (head amplifier) gain knob 212, a phantom power button 213, a phase reverse button 214, an insertion button 215, a direct-out button 216, a surround pan 217, an equalizer block 218, a gate block 219, a compressor block 220, a send level block 221, an ST button 223, a pan knob 224, a fader bar 225, an ON button 226, a CUE button 227, and a SEL button 228.

Among them, the channel name blocks 211 and 229 are blocks displaying the number, name, intended use, and so on of the channel. For easier view, the same blocks are provided on the upper and lower sides, and changing the contents of one of the blocks results in a change in the contents of the other accordingly.

The HA gain knob 212 is a display portion displaying a gain of a head amplifier assigned to the corresponding channel by means of the position of a mark on the knob.

The phantom power button 213 and the phase reverse button 214 are display portions displaying ON/OFF of phantom power supply to the head amplifier assigned to the corresponding channel and displaying a normal/reverse phase of the head amplifier. The insertion button 215 and the direct-out button 216 are display portions displaying ON/OFF of insertion effect and direct-out. With a single click of these buttons, the above ON/OFF or the like can be switched.

The surround pan 217 is a display portion displaying a sound image localization position of sound outputted from the corresponding channel in a case where a surround mode of one of 3-1 channel, 5-1 channel, and 6-1 channel is used.

The equalizer block 218 is a display portion displaying a graph representing a frequency characteristic of the equalizer 53 shown in FIG. 3, based on a current value of a parameter.

The gate block 219 is a display portion displaying a three-stage indicator representing the presence/absence of a signal and an open/closed state of a gate, based on a value of a parameter set for the noise gate 54 and the contents of a currently processed signal.

The compressor block 220 is a display portion displaying input signal level, a gain reduction in the compressor 55, and a threshold value, based on a value of a parameter set for the compressor 55 and the contents of a currently processed signal.

The send level block 221 is a display portion displaying levels set for the send level faders 62 by means of bar graphs 222 corresponding to the numbers assigned to the MIX buses 72 as transmission destinations. Further, ON/OFF states of the corresponding send ON switches 63 may be displayed by difference in brightness, color, or pattern of the bar graphs 222.

The ST button 223 is a display portion displaying ON/OFF of the TO-ST switch 58. With a single click of the button, this ON/OFF can be switched.

The pan knob 224 is a display portion displaying a sound image localization position set for the pan 59, by means of the position of a mark on the knob.

The fader bar 225 is a display portion displaying a value of a level adjustment amount set for the volume 56.

The ON button 226 is a display portion displaying ON/OFF of the ON switch 57. The CUE button 227 is a display portion displaying the presence/absence of a cue output of the corresponding channel. The SEL button 228 is a display portion displaying a selection/non-selection state of the corresponding channel. With a single click of these buttons, the above ON/OFF or the like can be switched.

In the normal mode, a user can move a cursor 230 in the input channel screen 200 by performing a slide operation on the touch screen 104. Further, a button or the like at the position where the cursor 230 resides can be clicked by a pressing operation of the click button 105 or a tapping operation on the touch screen 104.

When the input channel screen 200 is displayed on the display panel 101, the eight encoders 102 shown in FIG. 4 come to positions corresponding to the respective channel slots 210, as shown by virtual lines in FIG. 5. With these encoders 102, it is possible to give instructions to change values of parameters displayed in the corresponding channel slots 210.

Table 1 shows processing executed by the CPU 11 when the various operations described above are sensed.

Note that a group cursor is a cursor displayed at a corresponding position in all the eight channel slots as shown by the reference numeral 231 in FIG. 5. For example, when, in any of the channel slots, the bar graph 222 corresponding to the third MIX output bus 72 in the send level block 221 is clicked, the group cursor 231 is moved to the position of the bar graph 222 corresponding to the third MIX output bus 72 in all the channel slots.

As is understood from Table 1, as for parameters whose values are displayed by means of the bars or the knobs in the input channel screen 200, a user can change their values by operating the encoders 102 after single-clicking the bars or the knobs to move the group cursor 231 thereto.

As for parameters whose values are displayed by means of the buttons, a user can change their values by single-clicking the buttons, and as for the name, a user can edit it by clicking the channel name blocks 211, 229 and inputting the contents by using the keyboard 103.

However, the input channel screen 200 has a limited space and cannot display values of all the parameters. Therefore, when a user wants to edit a value of a parameter not displayed in the input channel screen 200, the user double-clicks a control or a block associated with this parameter to have the detailed edit screen corresponding to the clicked control or block displayed on the touch screen 104, thereby capable of editing the parameter associated with the clicked control or the block in this screen.

The double-click operation corresponds to an operation to select the parameter corresponding to the clicked control or block as a parameter to be edited, and when the detailed edit screen is displayed on the touch screen 104, the CPU 11 performs the control in the detailed edit mode until this screen is erased.

Next, several display examples of the detailed edit screen and examples of edit operations accepted in this screen will be shown.

First, FIG. 6 shows a display example of a detailed edit screen for insertion effect.

This detailed edit screen 310 is a screen displayed when the insertion button 215 is double-clicked and is a screen to accept the setting regarding an insertion effect. In a target channel display portion 311, a number assigned to a channel whose setting is accepted (here, "IN 3" indicating the third input channel) and its name (here, "AD 3") are displayed.

Further, in this screen, the setting of the position where the insertion effect is inserted is selectively accepted by an insertion position setting button 312.

An ON/OFF setting button 313 accepts ON/OFF setting of the insertion effect by a toggle. An item set here is the same as that accepted when the insertion button 215 is single-clicked in the input channel screen 200.

Further, in an insertion effect selection portion 314, a pull-down menu accepts the setting of the type of the effect to be inserted. Further, an end button 315 accepts an instruction to close the detailed edit screen 310. Incidentally, a control having an equivalent function to the end button 315 may be separately provided as hardware.

As for an operation of each of the buttons, a tapping operation to the position of the button in the touch screen 104 is accepted as the pressing of the button. As for an operation of the pull-down menu, options are displayed in response to a tap operation to the position of a triangular mark, and a tap operation to the position of one of the options is accepted as the selection of the option.

When any of these operations is sensed, the CPU 11 changes the values of the parameters stored in the current memory according to the operation. In this case, the CPU 11 functions as a parameter editing device.

When the pressing of the end button 315 is accepted, the detailed edit screen 310 is erased, and the control returns to the normal mode.

How operations regarding controls in the same category (buttons, knobs, and so on) are accepted, that values of parameters stored in the current memory are changed according to an operation sensed by the CPU 11, and that the control returns to the normal mode in response to the pressing of the end button are common to detailed edit screens to be described below, and therefore, what have been described will be omitted or only briefly described.

Next, FIG. 7 shows a display example of a detailed edit screen for direct-out.

This detailed edit screen 320 is a screen displayed when the direct-out button 216 is double-clicked and is a screen to accept the setting regarding the direct-out. In a target channel display portion 321, the number and name of a channel are displayed as in the detailed edit screen 310.

Further, in this screen, an acquisition position setting button 322 selectively accepts the setting of a position where a signal to be outputted to the direct-out line 45 is taken out.

An ON/OFF setting button 323 accepts, by a toggle, the setting of ON/OFF of output of the direct-out. The setting for the same item is accepted here as that accepted in response to the single-click of the direct-out button 216 in the input channel screen 200.

Further, in an output destination selection portion 324, a pull-down menu accepts the setting of a port of the waveform I/O 15 to which the output of the direct-output is patched. An end button 325 accepts an instruction to close the detailed edit screen 310.

Next, FIG. 8 shows a display example of a detailed edit screen for a parametric equalizer.

This detailed edit screen 330 is a screen displayed when the equalizer block 218 is double-clicked and is a screen to accept the setting regarding the equalizer 53. In a target channel display portion 331, the number and name of the channel are displayed as in the detailed edit screen 310.

In this screen, first, four operation points 333 displayed in a characteristic display portion 332 accept the setting of characteristics of four filter elements included in the equalizer 53. A characteristic curve 334 is a curve showing a characteristic of the whole equalizer 53 realized by the filter elements. A pass button 335 accepts, by a toggle, the setting regarding whether or not the filter element corresponding to the selected operation point 333 is to have a through characteristic, and a Q value setting knob 336 accepts the setting of a Q value of the filter element corresponding to the selected operation point 333.

As for an operation of the operation point 333, a tap operation to the position of the operation point 333 on the touch screen 104 is accepted as an instruction to select the operation point 333 as an operation target, and a drag operation of the operation point 333 is accepted as an instruction to move the operation point 333 in accordance therewith. According to the position of the operation point 33, designation of a center frequency of the filter (horizontal axis) and a peak value of a gain (vertical axis) is accepted.

As for an operation of the knob, when a drag operation of rotating the knob around its center from the position of the knob is performed on the touch screen 104, this is accepted as a rightward rotation or a leftward operation and is accepted as an instruction to change a value according to an amount of the rotation.

Incidentally, in the detailed edit screen 330, an ON/OFF setting button 337 accepts, by a toggle, the setting of ON/OFF of a function of the whole equalizer 53, and an end button 338 accepts an instruction to close the detailed edit screen 330.

Next, FIG. 9 shows a display example of a detailed edit screen for surround pan.

This detailed edit screen 340 is a screen displayed when the surround pan 217 is double-clicked while a surround mode is set effective by a not-show control, and is a screen to accept the setting regarding the surround pan. In a target channel display portion 341, the number and name of the channel are displayed as in the detailed edit screen 310.

In this screen, a sound image localization position setting portion 342 accepts the setting of a sound image localization position, and a marker 343 indicates the currently set position. According to the localization position set here, surround mixing is performed in the mixing bus. Further, an end button 344 accepts an instruction to close the detailed edit screen 340.

As for an operation for the setting of the sound image localization position, a touch operation to the inside of the sound image localization position setting portion 342 in the touch screen 104 is accepted as an instruction to localize a sound image to the touched position, or a drag operation of the position of a marker 343 is accepted as an instruction to move the sound image localization position.

Figure 10:
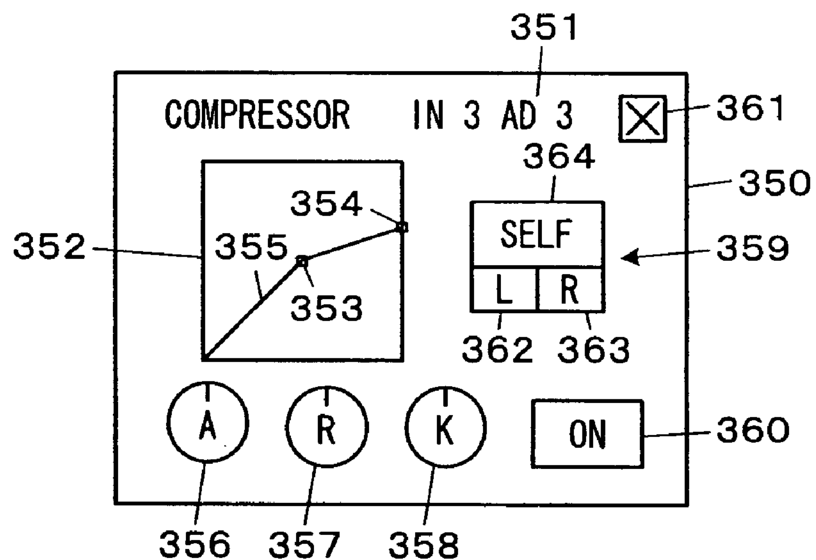
FIG. 10 is a view showing a display example of a detailed edit screen for compressor displayed on the touch screen.

Next, FIG. 10 shows a display example of a detailed edit screen for compressor.

This detailed edit screen 350 is a screen displayed when the compressor block 219 is double-clicked and is a screen to accept the setting regarding the compressor 55. In a target channel display portion 351, the number and name of the channel are displayed as in the detailed edit screen 310.

In this screen, first, a threshold operation point 353 and a rate operation point 354 which are displayed in a characteristic display portion 352 accept the setting of threshold level and rate of the compressor 55. Further, a characteristic of the compressor 55 according to the set contents is displayed by a characteristic curve 355. Input level of a key-in channel is taken on a horizontal axis and corresponding output level is taken on a vertical axis.

In the detailed edit screen 350, an attack knob 356, a release knob 357, and a knee knob 358 accept the setting of attack, release, and knee of the compressor 55 respectively, and a key-in setting portion 359 accepts the setting of key-in indicating a channel whose input level is to be referred to for deciding output level of the current target channel. Further, an ON/OFF setting button 360 accepts, by a toggle, the setting of ON/OFF of the function of the whole compressor 55, and an end button 361 accepts an instruction to close the detailed edit screen 350.

Incidentally, in the key-in setting portion 359, by operating an "L" button 362 and an "R" button 363, it is possible to change a target input channel in descending order and in ascending order respectively, and the set channel is displayed in a channel display portion 364. "SELF" indicates that the current target channel itself is set as a reference channel.

Operations of the operation points 353, 354 are accepted in the same manner as in the case of the operation point 333 in FIG. 8, and the rate operation point 354 can be moved within a range positioned at a right end of the characteristic display portion 352 and upper than the threshold level.

Figure 11:
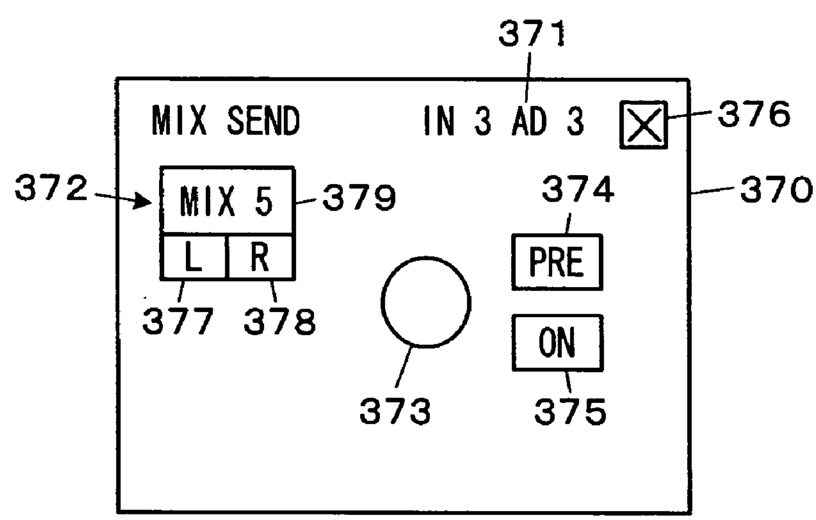
FIG. 11 is a view showing a display example of a detailed edit screen for mix send displayed on the touch screen.

Next, FIG. 11 shows a display example of a detailed edit screen for mix send.

This detailed edit screen 370 is a screen displayed when the send level block 221 is double-clicked and is a screen to accept the setting regarding the PRE/POST switch 61, the send level fader 62, and the send ON switch 63. In a target channel display portion 371, the number and name of the channel are displayed as in the detailed edit screen 310.

In this screen, first, a MIX bus selection portion 372 accepts selection of an output path to a MIX bus for which parameters are to be set. Here, with an "L" button 377 and an "R" button 378, it is possible to change a bus number sequentially in descending order and in ascending order respectively, and a set MIX bus is displayed in a MIX bus display portion 379.

A volume knob 373 accepts the setting of a gain of the send level fader 62 in the output path from the current target channel to the MIX bus displayed in the MIX bus display portion 379. A PRE/POST button 374 and an ON button 375 accept, by a toggle, the setting of the PRE/POST switch 61 and the send ON switch 63 in this output path.

An end button 376 accepts an instruction to close the detailed edit screen 370.

In the digital mixer 10, the detailed edit screens as described above are displayed on the touch screen 104 which is a different display from the display panel 101. Therefore, even when any of the detailed edit screens is displayed, a main screen such as the input channel screen 200 is not hidden. Therefore, a user can perform a parameter edit operation with the knowledge of the overall state of values of parameters by constantly referring to the main screen.

Furthermore, operations to the main screen and operations to the detailed edit screen can all be performed on the touch screen 104, which frees a user from a trouble of moving his/her hand from place to place for the parameter edit operation and thus provides high operability. In particular, if the touch screen 104 is closer to a user than the display panel 101, a user can perform the parameter setting operation without moving his/her hand far and thus still higher operability is obtained.

Further, in the detailed edit mode, if an operation sensed by the touch screen 104 is not recognized as a cursor moving operation or a click operation on the main screen, it is possible to prevent unintended movement of the cursor in the main screen or unintended change of values of parameters during the operation to the detailed edit screen, which can provide still higher operability.

The foregoing has described this embodiment, but it goes without saying that the structure and concrete processing contents of the device, the display contents on the screen, the operation methods, and so on are not limited to those described in the above embodiment.

For example, some display may be performed on the touch screen 104 also in the normal mode. However, in this case, the display contents are preferably those having nothing to do with a specific parameter, and grid display, display showing an operable area, and the like are conceivable as the display contents.

The above description shows the example where the main screen used in the digital mixer 10 is the input channel screen 200, but it goes without saying that a plurality of main screens may be made displayable simultaneously or may be made switchable. Another possible example of the main screen is an output channel screen for accepting the setting of parameters regarding the output channels.

Further, the display panel 101 may also be formed as a touch screen having a stacked touch panel so that a user's touch operation to the display panel 101 can be accepted as a click operation to the touched position.

With this structure, it is possible to perform a click operation to an arbitrary position without moving the cursor 230. In this case, it is preferable that an operation to a screen on the display panel 101 can be performed also on the touch screen 104, and a user can perform the operation in either way that suits his/her taste.

It is not essential that the first and second displays are structured as different display panels. It is only necessary that different display areas are prepared for these displays, and a display area on the same display may be divided, with a part thereof being used as the first display and another part being used as the second display.

It goes without saying that the invention is applicable not only to the digital mixer but also to audio signal processors of a synthesizer, an electronic musical instrument, and the like and is of course applicable to signal processors processing signals other than audio signals. Further, the invention is applicable to a parameter editor accepting an edit operation of values of parameters used in any device other than a signal processor.

In these cases, it is not essential that the parameter editor includes a display or an operation accepting device, and the parameter editor may be a device which obtains information on an operation accepted by an external operation accepting device, changes values of parameters and creates screen display data based on the obtained information, and makes an external display perform the display.

As is apparent from the above description, the parameter editor or the signal processor of the invention enables a user to perform a detailed edit operation of values of parameters with high operability while referring to a main screen.

Therefore, the application of the invention makes it possible to enhance operability in editing values of parameters.

TABLE 1

| sensed operation event | processing executed by CPU |
|---|---|
| single click of a bar or a knob | move a group cursor to controls of channels corresponding to a clicked control |
| operation of an encoder | according to the operation, change a value of a parameter corresponding to a control where the group cursor resides in a channel corresponding to the operated encoder |
| single click of a button | change a value of a parameter corresponding to the clicked button to a subsequent candidate |
| single click of a name display portion | display a cursor in the clicked name display portion and make the name editable by a keyboard |
| double click | display a detailed edit screen corresponding to a clicked control or block on a touch screen, and shift to a detailed edit mode |

What is claimed is:

1. A parameter editor apparatus, comprising:

a first display device that displays a screen of a plurality of blocks;

a touch pad having a second display device to display a pop-up screen and an accepting device that accepts an operation on the touch pad by a user;

a knob that accepts an instruction to adjust values of parameters;

a controller that selectively responds to different user operations in that, when the touch pad accepts a single click operation on one of the blocks in the screen displayed on the first display device, the controller selects a parameter corresponding to the one block as a parameter to be adjusted according to the instruction accepted by the knob, and when the touch pad accepts a double click operation on one of the blocks in the screen displayed on the first display device, the controller controls the touch pad to display on the second display device a pop-up screen corresponding to the one block; and an editor that, during the state when the pop-up screen is displayed on the second display device, changes a value of a parameter displayed on the pop-up screen according to the operation on the touch pad, wherein the screen of the plurality of blocks displayed on the first display device is maintained independently of any operation on the touch pad during the state when the pop-up screen is displayed on the second display device.

2. The parameter editor according to claim 1, wherein the respective blocks in the screen displayed on the first display device correspond to information based on current parameter values, and wherein the pop-up screen on the second display device displays additional information based on additional parameter values.

3. A signal processor apparatus, comprising:

a memory storing values of a plurality of parameters;

a signal processing device performing signal processing based on the values of the parameters stored in the memory;

a first display device displaying a main screen including a plurality of blocks;

a touch pad having a second display device to display a pop-up screen and an accepting device that accepts an operation on the touch pad by a user;

a knob that accepts an instruction to adjust values of parameters; and a controller that selectively responds to different user operations in that, when the touch pad accepts a single click operation on one of the blocks in the main screen displayed on the first display device, the controller selects, from the memory, a parameter corresponding to the one block as a parameter to be adjusted according to the instruction accepted by the knob, and when the touch pad accepts a double click operation on one of the blocks in the main screen displayed on the first display device, the controller controls the touch pad to display on the second display device a pop-up screen corresponding to the one block; and an editor that, during the state when the pop-up screen is displayed on the second display device, changes a value of a stored parameter corresponding to the block displayed on the pop-up screen in accordance with operations on the touch pad, wherein the main screen of the plurality of blocks displayed on the first display device is maintained independently of any operation on the touch pad during the state when the pop-up screen is displayed on the second display device.

4. The signal processor according to claim 3, wherein the respective blocks in the main screen displayed on the first display device correspond to information based on current parameter values of the parameters, and wherein the pop-up screen on the second display device displays additional information based on additional parameter values.

* * * * *